March 30, 1926.

R. J. KRAUSE 1,578,530

VENTILATING, HEATING, COOLING, HUMIDIFYING, AND EVAPORATING APPARATUS

Filed Feb. 2, 1925   3 Sheets-Sheet 1

Inventor
ROBERT J. KRAUSE.

By A. B. Bowman
Attorney

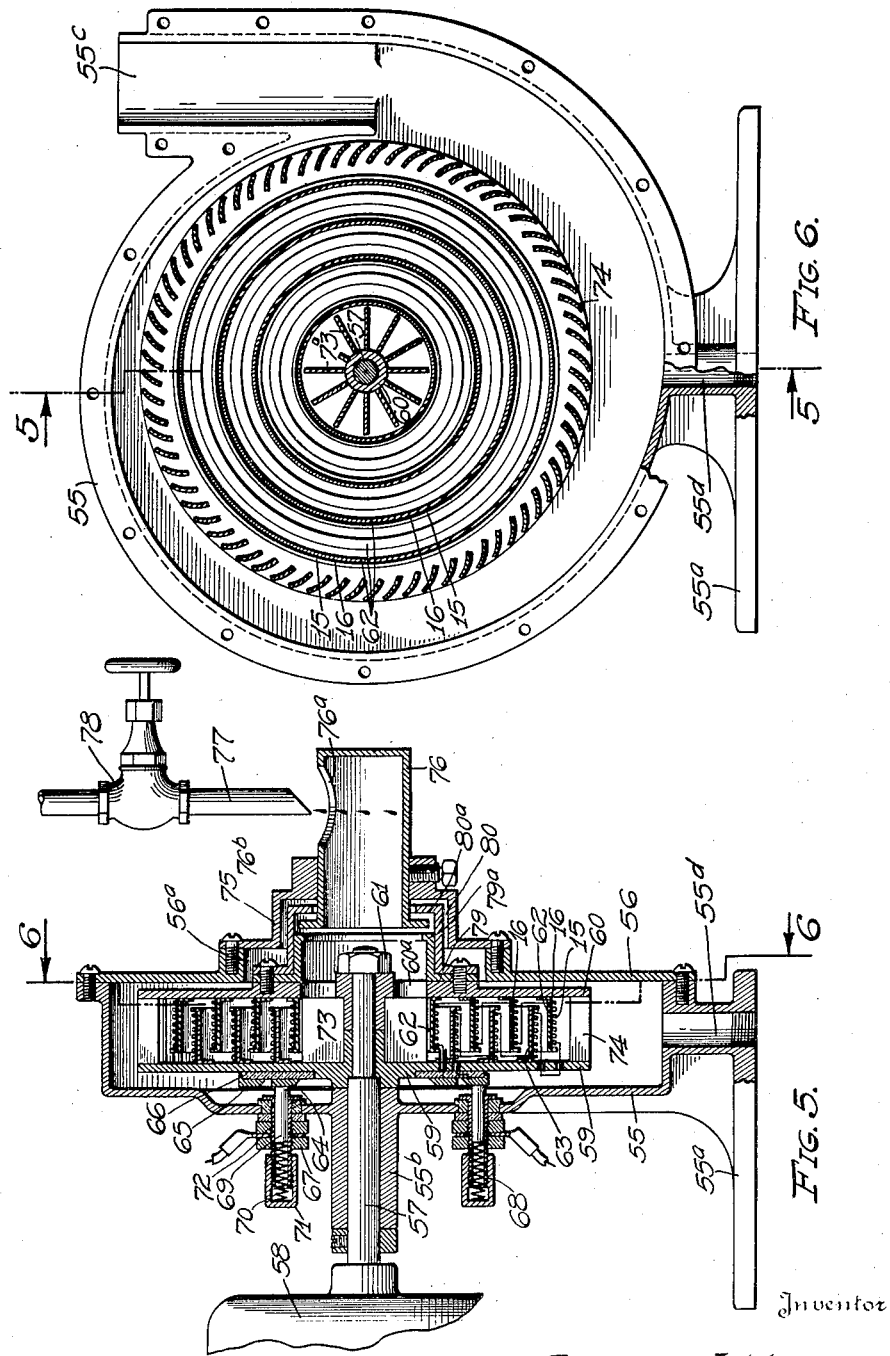

Patented Mar. 30, 1926.

1,578,530

UNITED STATES PATENT OFFICE.

ROBERT J. KRAUSE, OF LOS ANGELES, CALIFORNIA.

VENTILATING, HEATING, COOLING, HUMIDIFYING, AND EVAPORATING APPARATUS.

Application filed February 2, 1925. Serial No. 6,496.

*To all whom it may concern:*

Be it known that I, ROBERT J. KRAUSE, a citizen of the United States, residing at Los Angeles, in the county of Los Angeles and State of California, have invented a certain new and useful Ventilating, Heating, Cooling, Humidifying, and Evaporating Apparatus, of which the following is a specification.

My invention relates to ventilating, heating, cooling and humidifying apparatus, and the objects of my invention are: First, to provide an apparatus of this class which may be used either as a ventilating, heating, or cooling fan or blower, or as a humidifier, as and when desired; second, to provide a novel heating means in combination with a fan or blower for an apparatus of the class mentioned; third, to provide a novel means in combination with a fan or blower for saturating air or other gas with moisture; fourth, to provide a novel means in combination with an apparatus of the class mentioned for cooling or washing air or other gas or charging or saturating the air or other gas with water or other liquid, in which means the air or other gas is forced through a thin film or spray of the water or other liquid; fifth, to provide a novel water or other liquid heating means; sixth, to provide a means in combination with an apparatus of the class mentioned for simultaneously heating water or other liquid and spraying the same to form a substantially continuous water or liquid screen through which air or other gas may be passed; seventh, to provide as a whole a novelly constructed apparatus for ventilating, heating and cooling and for humidifying air, and eighth, to provide an apparatus of this class which is simple and economical of construction proportionate to its functions, durable, efficient, and which will not readily deteriorate or get out of order.

Figure 1:
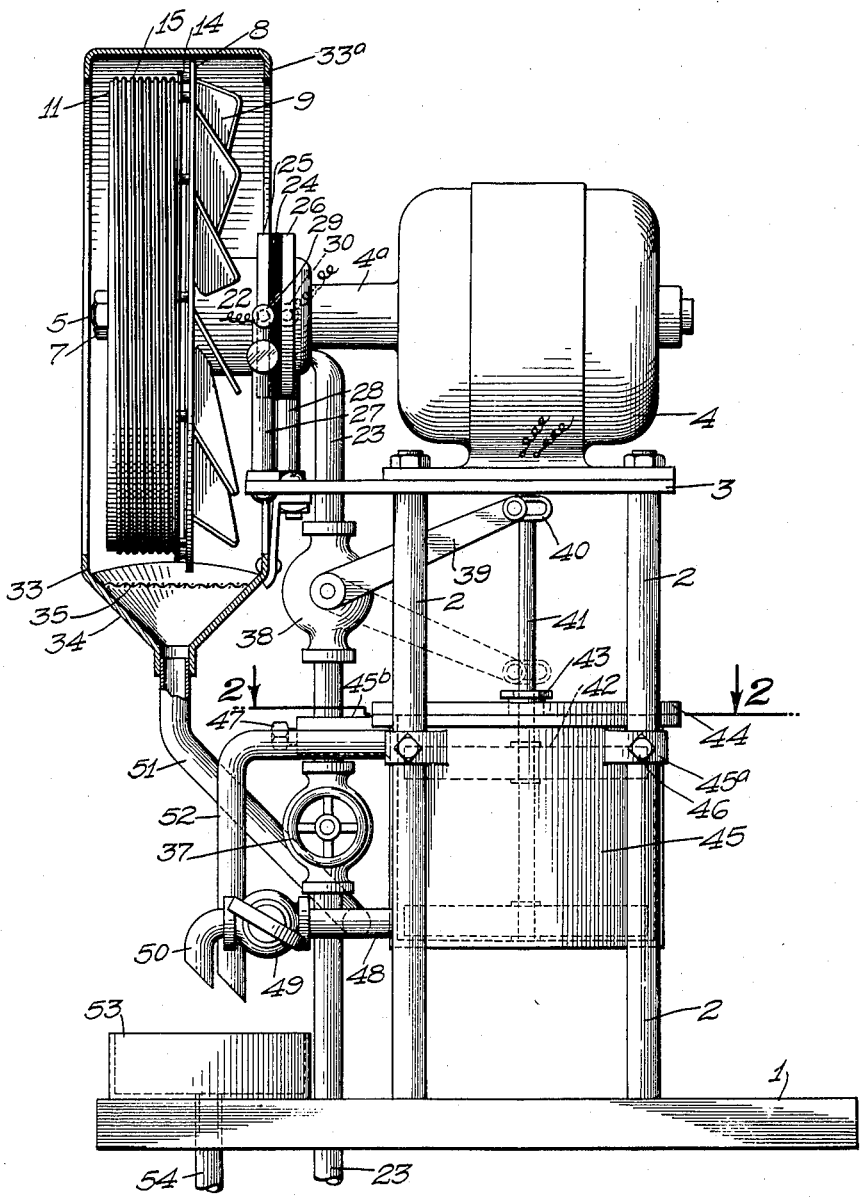
Figure 2:
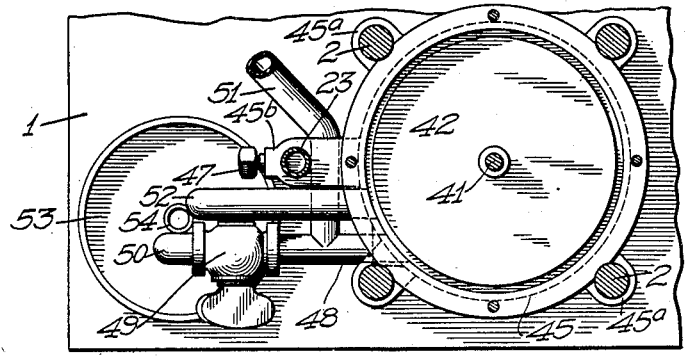
Figure 3:
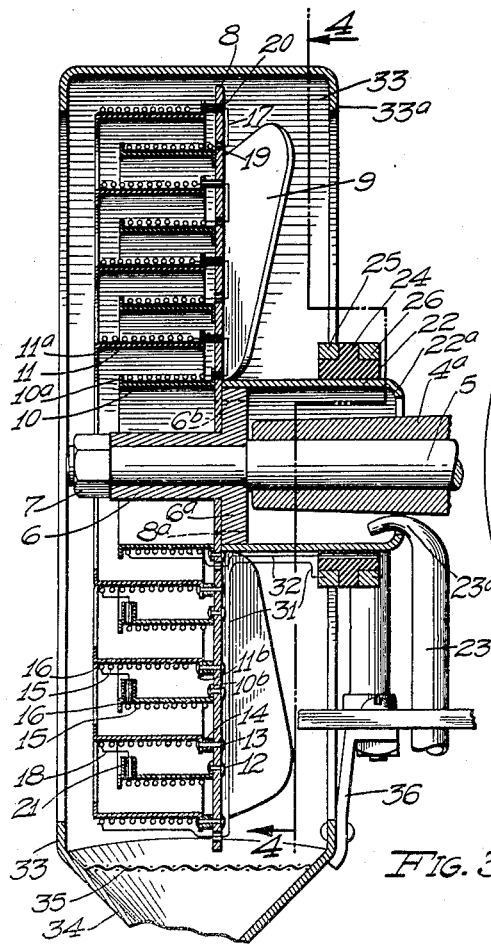
Figure 4:
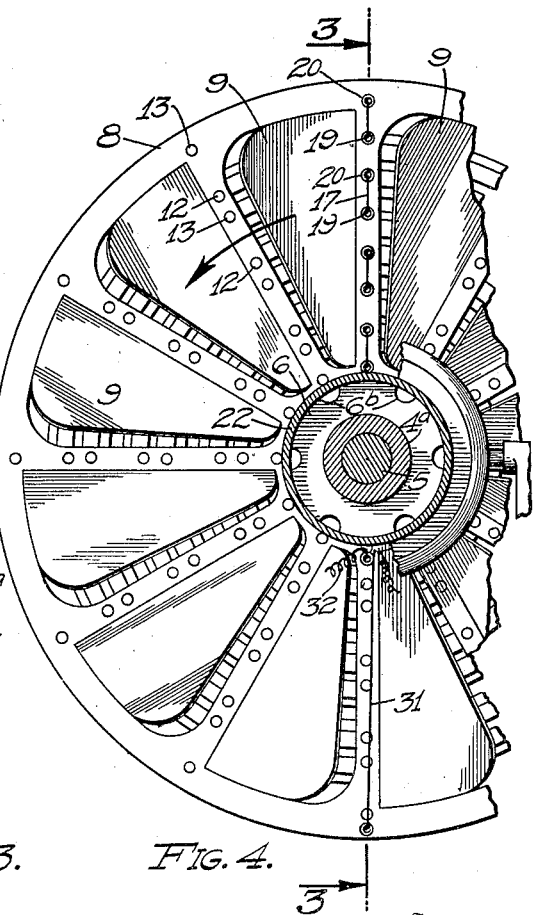

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my ventilating, heating, cooling and humidifying apparatus in one form of construction, showing the casing for enclosing the fan means and other members, partially broken away and in section to facilitate the illustration; Fig. 2 is a sectional view thereof in plan, taken through 2—2 of Fig. 1; Fig. 3 is an enlarged sectional elevational view of the fan means of the structure shown in Fig. 1, with the section taken through 3—3 of Fig. 4; Fig. 4 is a fragmentary end view of the fan means and other members connected thereto, with the view taken at 4—4 of Fig. 3; Fig. 5 is a sectional elevational view of my apparatus in a slightly modified form of construction, showing the same connected to a fragmentary portion of an electric motor, and showing certain parts and portions of the apparatus in elevation to facilitate the illustration, and Fig. 6 is a sectional elevational view thereof, taken through 6—6 of Fig. 5.

Like characters of reference refer to similar parts and portions throughout the several views of the drawings.

The supporting frame of my apparatus, shown in Figs. 1, 2, 3 and 4, consists preferably of a base plate 1, a plurality of upright supporting columns 2 secured to and extending above the base plate 1, and a plate 3 secured to the upper ends of the columns 2. On the upper side of the plate 3 is secured the electric motor 4, which is preferably provided with a long journal $4^a$ through which the motor shaft 5 extends. At the end of the shaft 5 extending through the long journal $4^a$ is secured the fan means which consists primarily of a hub member 6 secured to the shaft 5 by means of a nut 7, a metal disc 8 secured to the hub member 6 and fan blades 9 punched from and bent backwardly from the disc 8, as shown best in Figs. 1, 3 and 4. To the normally front side of the fan disc 8, or on the side thereof opposite the fan blades 9, are secured a plurality of concentric drums or cylindrical rings 10 and 11 by means of rivets 12 and 13, respectively. The drums 11 are longer than the drums 10 and are also spaced at their inner ends from the disc 8 by means of spacers 14, the drums 10 being directly joined to the front face of said disc. The front or outer ends of the drums 10 are provided with annular outwardly extending flanges $10^a$, while the drums 11 are provided at their forward or outer ends with annular inwardly extending flanges $11^a$. The inner ends of the drums 10, except the drum positioned nearest the hub member 6, are provided with inwardly extending flanges $10^b$, while the inner ends of the drums 11 are provided with outwardly extending annular flanges $11^b$.

Around the peripheries or outer faces of the drums 10 and 11 are wound coils of resistance wire 15 for heating the inner sides of said drums, there being positioned insulating materials, such as mica, 16, between said coils and the outer faces of the drums. These heating coils are connected in series with each other by means of connecting wires 17 and 18, the connecting wires 17 connecting pairs of adjacent coils at their normally rear ends through the disc 8 at the one end of said disc, said connecting wires 17 extending through insulating sleeves 19 and 20, the latter extending through the space provided between the disc 8 and the inner ends of the longer drums 11, as shown in Fig. 3. The connecting wires 18 connect the outer ends of opposite pairs of adjacent coils 15 at the diametrically opposite side of the shaft 5 from the connecting wires 17 to substantially counterbalance the fan means, as shown best in Fig. 3, the connecting wires 18 extending inwardly from and connected to the heating coils 15 wound around the drums 10 extending also through insulating sleeves 21 to protect the wires from the water or other liquid adhering to the inner faces of said drums.

To the periphery of the enlarged portion $6^a$ at the inner end of the hub member 6 is secured the normally outer or forward end of the rotating cylinder or gutter 22, which extends backwardly therefrom over a portion of the long journal $4^a$ of the motor 4. The end of the cylinder or gutter 22 opposite the hub member 6 is turned inwardly, as indicated by $22^a$, to prevent water or other liquid discharged into the interior of the cylinder 22 through the nozzle portion $23^a$ of the conductor 23 from flowing from said end. Near the periphery of the enlarged annular portion $6^a$ of the hub member 6 are provided a plurality of perforations or ports $6^b$ for permitting the water or other liquid discharged into the cylinder 22 in flowing toward and onto the inner surface of the inner drum 10, there being also provided holes $8^a$ through the disc 8 in alinement with the holes $6^b$.

Near the free end and around the periphery of the revolving cylinder 22 is mounted a commutator consisting of an annular insulating member 24 and a pair of separate conductor rings 25 and 26 insulated from each other. On the plate 3 are mounted a pair of brush supports 27 and 28 which support carbon contact brushes 29 and 30, respectively, in engagement with the respective conductor rings 25 and 26, said carbon brushes being connected to a convenient source of electrical energy. The conductor rings 25 and 26 are respectively connected, by means of wires 31 and 32, respectively, to the heating coils 15 positioned around the outer drum 11 and the inner drum 10 for conducting electrical energy thereto.

Around the fan means described above is positioned an annular casing 33 in the form of a gutter, which is provided at its lower end with a funnel portion 34, there being provided at the upper end of this funnel portion a screen 35. The casing 33 is provided with no front or rear end walls except inwardly extending annular flanges $33^a$ which prevent water or other liquid discharged therein from the fan means from being thrown from the casing except at its lower end. This casing is preferably supported on the plate 3 by means of brackets 36.

The conductor 23 is connected to a suitable water supply. In this conductor are positioned a manual water control valve 37 and an automatic control valve 38. The valve 38 is provided with a control lever 39 which is pivotally connected at its free end, by means of a transversely slotted head member 40, to the one end of a plunger rod 41 which extends through a stuffing box member 43 positioned in the head member 44 secured to the upper end of the float chamber member 45. In the float chamber member 45 is positioned a float plunger 42 which is connected to the end of the plunger rod 41 extending into the chamber member. The chamber member is supported on the supporting columns 2 of the frame by means of hollow lugs $45^a$ through which the columns 2 extend and by means of set screws 46 extending through said lugs.

The conductor 23 extends through a lug $45^b$ secured to the one side of the chamber member 45 and is secured in said lug by means of a set screw 47.

To the lower end of the chamber member 45 is connected a discharge conductor 48 which is provided with a control cock 49 and a discharge nozzle 50. The water discharged from the nozzle 50 is adapted to flow or drip into a drip pan 53 which is provided with a suitable discharge conductor 54. The lower reduced end of the funnel portion 34 of the casing 33 is connected by means of a conductor 51 to the conductor 48 connecting the chamber member 45 with the control cock 49. The chamber member 45 is provided at its upper end with an overflow conductor 52 which is also adapted to discharge the water from said chamber member into the drip pan 53.

To permit water to be discharged into the rotating cylinder or gutter 22, the manual control valve 37 is opened permitting the water to flow through the valve 38, providing the lever 39 thereof is in the lower dotted line position, and through the nozzle portion 23ª into the rotating cylinder or gutter. When the cock 49 is closed, the water not evaporated by the fan means flows through the conductor 51 into the chamber member 45 raising the float therein to the upper position, thus closing the valve 38 and preventing the discharge of more water into the rotating cylinder 22. When the cock 49 is slightly open, as shown in the drawings, a certain amount of the water from the conductor 51 is permitted to be discharged into the drip pan 53 and the water remaining in said conductor and the chamber member 45 is adapted to raise the float therein to a certain position, which position determines the amount of water discharged through the nozzle portion 23ª. Therefore, the discharge of water into the fan means is visibly controlled by the cock 49.

It will be seen from the construction of the fan means, as shown and described, that the water from the rotating cylinder 22 flows into the interior of the inner drum 10 in which it is thrown by centrifugal force over its entire interior surface and discharged from the front end thereof into the interior of the drum 11 positioned concentrically around the same. The water is also compelled by centrifugal force to cover substantially the whole of the interior face of the latter drum and is forced by centrifugal force beyond its inner edge to the interior of the next drum 10¹ positioned concentrically around the former. This process is continued until the water is discharged from the last drum 11 into the gutter of the casing 33 from which it is discharged into the conductor 51. It will be seen that as the water is discharged from one drum to the other, a very thin film or fine spray is formed between the several concentric drums. Therefore, the air forced between the several drums by the fan blades 9 is compelled to absorb a certain amount of the fine spray or mist or vaporize a certain amount of the water in its passage between said drums, thus cooling the air and water.

When the valve 37 or the cock 49 is shut off, no water is permitted to be discharged into the fan means, and the apparatus may then be used simply as a ventilating fan.

When the water is shut off and the drums heated, as described above, and the disc 8 rotated, the apparatus may be used as a heating means. And when water is discharged into the fan means and the heat is applied, the apparatus may be used as a humidifier.

The modified form of construction of my apparatus, shown in Figs. 5 and 6, is adapted to perform the functions above mentioned, and in addition thereto, to serve as a gas washer. The casing in this modified form of my apparatus is constructed in the form of a blower and consists of a hollow casing member 55 supported on a base 55ª and a cover plate 56 secured to the open side thereof. The casing member 55 is provided with a journal 55ᵇ which extends outwardly therefrom and in which is revolubly mounted a shaft 57 of the motor or other power unit 58. On the portion of the shaft 57 extending into the casing are mounted a pair of oppositely disposed discs 59 and 60 which are secured on said shaft by a nut 61. The outer portions of the disc members 59 and 60 are spaced apart and in the space between these two disc members are positioned in staggered relation, a plurality of concentric drums 62 and 63, the drums 62 being secured to the disc member 60 and spaced from the other disc member 59, and the drums 63 being secured to the disc member 59 and spaced at its opposite ends from the disc member 60, thus providing a zigzag channel for the water or other liquid and the air or other gas passed therethrough. These drums are provided at their free ends with outwardly turned annular flanges for protecting the heating coils 15 of resistance wire from the water or other liquid. These heating coils 15 are wound around the outer faces of the several drums and are insulated therefrom by an insulating material 16, such as mica. Said heating coils are preferably connected in series with each other, as shown in Fig. 5, the free ends of the conductors connected to said heating coils being connected to a pair of concentric conductor rings 64 and 65 supported on the outer side of the disc member 59 and insulated therefrom by a circular insulating member 66. In the side wall of the casing member 55 are mounted a pair of brush supports 67 and 68 in which are reciprocally mounted carbon contact brushes 69, one being adapted to engage each of said conductor rings 64 and 65. These brushes 69 are held in engagement with the respective conductor rings by means of compression springs 70 engaging the outer ends of said brushes and engaging at the outer ends the inner ends of the adjusting caps 71, screwably mounted at the outer ends of sleeves 72 positioned within the brush supports 67.

At the hub portions and between the disc portions of the disc members 59 and 60 are mounted a plurality of outwardly radiating fan blades 73. At the peripheries of and between said disc members is provided a circular row of other fan blades 74 of curved construction and positioned angularly with the radii of the supporting disc members. Near the hub portion of the disc member 60 and through the sidewall thereof are provided a plurality of perforations 60ª, through which both water, or other liquid, and air, or other gas, are adapted to be drawn.

The cover plate 56 is provided with a central opening 56ª over which is secured an annular supporting member 75 through which extends and in which is secured the liquid and gas inlet member 76. This member 76 is preferably provided at its upper side with an opening 76ª through which water or other liquid from the conductor 77 may be discharged in regulated quantities, there being provided a control valve 78 in said conductor for controlling said liquid. The portion of the member 76 extending through the supporting member 75 is provided with an outwardly extending annular flange 76ᵇ which extends into an annular channel formed between the outer ends of a pair of concentric interpositioned annular members 79 and 80 secured to the outer side and near the hub portion of the disc member 60. The members 79 and 60 are provided at said outer ends with inwardly extending flanges 79ª and 80ª which form the channel above mentioned, the annular flange 80ª extending inwardly a greater distance than the flange 79ª, therefore water or other liquid discharged into the annular channel formed, as stated, will flow over the annular flange 79ª rather than over the annular flange 80ª, thus a water or liquid seal is formed between the stationary member 76 and the revoluble members 79 and 80 for preventing the air or other gas drawn through the member 76 from being discharged into the outer portions of the casing 55 and out of the outlet 55ᶜ without passing through the intended channel between the disc members 59 and 60.

Any suitable connection may be made between the intake member 76 and the necessary air or gas supply.

Thus, it will be seen that when the shaft 57 is rotated, the liquid discharged into the member 76 from the conductor 77 and the gas drawn therein by the suction created by the fan blade will flow and be drawn into the space between the disc members 59 and 60 and be forced outwardly therefrom by centrifugal action in a zigzag channel between the several drums and out through the blades 74, the gas being discharged through the outlet 55ᶜ at the side of the casing, as shown in Fig. 6, and the liquid being discharged through an opening 55ᵈ at the lower end of the casing and conducted to a suitable drain. Thus, it will be seen that in this latter construction, both gas and liquid are forced outwardly by centrifugal force, but the function performed in this modified form of construction is the same as that described in connection with the other structures, although to the functions above enumerated may be added that of washing gas and evaporating liquids such as honey, fruit juices, sugar cane juices, beet sugar juices, salt water, etc., without excessive and damaging overheating and consequently adding to such liquids the merits and benefits of aeration.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In an apparatus of the class described, a revoluble supporting means provided with fluid inlet means from one side and near the hub portion thereof, and a plurality of staggered concentric drums supported on said revoluble supporting means, the one ends of each of said drums extending beyond the ends of the adjacent drums.

2. In an apparatus of the class described, a revoluble supporting means provided with fluid inlet means from one side and near the hub portion thereof, a plurality of staggered concentric drums supported on said revoluble supporting means, the one ends of each of said drums extending beyond the ends of the adjacent drums, and gas circulating means in combination with said revoluble supporting members for forcing gas between said drums.

3. In an apparatus of the class described, a revoluble supporting means provided with fluid inlet means from one side and near the hub portion thereof, a plurality of staggered concentric drums supported on said revoluble supporting means, the one ends of each of said drums extending beyond the ends of the adjacent drums, and heating means positioned at the outside faces of said drums for heating the interior faces thereof.

4. In an apparatus of the class described, a revoluble supporting means provided with fluid inlet means from one side and near the hub portion thereof, a plurality of staggered concentric drums supported on said revoluble supporting means, the one ends of each of said drums extending beyond the ends of the adjacent drums, and electric heating coils wound around the outer faces of said drums for heating the interior faces thereof.

5. In an apparatus of the class described, a revoluble supporting means, a plurality of staggered concentric drums mounted on said supporting means, and heating means positioned at the exterior faces of said drums for heating the interior faces thereof.

6. In an apparatus of the class described, a revoluble supporting means, a plurality of staggered concentric drums mounted on said supporting means, and electric coils wound around the exterior faces of said drums for heating the interior faces thereof.

7. In an apparatus of the class described, a revoluble supporting means, a plurality of staggered concentric drums mounted on said supporting means, heating means positioned at the exterior faces of said drums for heating the interior faces thereof, and fan blade means in combination with said revoluble supporting means for forcing gas between said drums.

8. In an apparatus of the class described, a revoluble supporting means, a plurality of staggered concentric drums mounted on said supporting means, electric coils wound around the exterior faces of said drums for heating the interior faces thereof, and fan blade means in combination with said revoluble supporting means for forcing gas between said drums.

9. In an apparatus of the class described, a casing, a supporting means revolubly mounted therein, and a plurality of concentric drums supported on said means in staggered relation relatively to each other, the one ends of said drums projecting beyond the adjacent ends of the adjacent drums and revoluble in the same direction therewith, whereby a liquid discharged against the inner face of the innermost drum is conducted to the outermost drum in zigzag passages in the form of thin films and fine sprays.

10. In an apparatus of the class described, a casing, a skeleton supporting member revolubly mounted therein, fan blades mounted on said supporting member, and a plurality of concentric drums secured to said supporting member on the side thereof opposite said fan blades.

11. In an apparatus of the class described, a casing, a skeleton supporting member revolubly mounted therein, fan blades mounted on said supporting member, and a plurality of concentric drums secured to the one side of said supporting member opposite said fan blades in staggered relation to each other, the one ends of said drums extending beyond the corresponding ends of the adjacent drums.

12. In an apparatus of the class described, a casing, a skeleton supporting member revolubly mounted therein, fan blades mounted on said supporting member, a plurality of concentric drums secured to said supporting member on the side thereof opposite said fan blades, and electric heating coils wound around the exterior faces of said drum for heating the interior faces thereof.

13. In an apparatus of the class described, a casing, a skeleton supporting member revolubly mounted therein, fan blades mounted on said supporting member, a plurality of concentric drums secured to the one side of said supporting member opposite said fan blades in staggered relation to each other, the one ends of said drums extending beyond the corresponding ends of the adjacent drums, and electric heating coils wound around the exterior faces of said drum for heating the interior faces thereof.

14. In an apparatus of the class described, a casing, a skeleton supporting member revolubly mounted therein, fan blades mounted on said supporting member, a plurality of concentric drums secured to said supporting member on the side thereof opposite said fan blades, electric heating coils wound around the exterior faces of said drum for heating the interior faces thereof, and a relatively small rotating cylinder secured to said supporting member and revolving threwith adapted to discharge water in regulated quantities onto the inner face of the innermost drum.

In testimony whereof, I have hereunto set my hand at Los Angeles, California, this 6th day of January, 1925.

ROBERT J. KRAUSE.